United States Patent [19]

Nikolaevsky et al.

[11] Patent Number: 5,792,336
[45] Date of Patent: Aug. 11, 1998

[54] METHOD FOR PURIFICATION OF WASTEWATER FROM SOLUBLE SUBSTANCES

[75] Inventors: Roman Nikolaevsky, Holon; Maria Monosov; Efim Monosov, both of Ariel; Eldad Sharony, Herzeliya; David Gurevich, Ariel, all of Israel

[73] Assignee: Elif Technologies Ltd., Ariel, Israel

[21] Appl. No.: 823,673

[22] Filed: Mar. 24, 1997

Related U.S. Application Data

[63] Continuation-in-part of Ser. No. 529,894, Sep. 18, 1995, abandoned.
[51] Int. Cl.[6] ............................................. C02F 1/461
[52] U.S. Cl. ........................ 205/742; 205/755; 205/756; 205/760; 210/754; 210/763
[58] Field of Search ........................... 205/742, 755, 205/756, 760; 210/754, 763

[56] References Cited

U.S. PATENT DOCUMENTS

| | | | |
|---|---|---|---|
| 3,616,355 | 10/1971 | Themy et al. | 204/149 |
| 3,719,570 | 3/1973 | Lancy | 204/151 |
| 4,179,347 | 12/1979 | Krause et al. | 204/149 |
| 4,470,891 | 9/1984 | Moore et al. | 204/98 |
| 4,879,047 | 11/1989 | Jackson | 210/756 |
| 5,393,724 | 2/1995 | Okajima et al. | 502/402 |

*Primary Examiner*—Arun S. Phasge
*Attorney, Agent, or Firm*—Mark M. Friedman

[57] ABSTRACT

A two stages electrocatalytic method for oxidative-purification of wastewater from soluble substances, such as toxic chemical admixtures difficult of oxidation, including dye-stuffs, detergents, phenols, cyanides and the like, which stages inactivate the soluble substances present in the wastewater in a synergistic fashion and, therefore, are highly efficient, the method comprising the steps of (a) in a first stage, electrochemically treating the wastewater in the presence of chlorine ions, such that chlorine-containing oxidizing agents are formed and at least partially oxidize the soluble substances in the wastewater; and (b) in a second stage, catalytically treating the first stage treated wastewater in presence of a non-chlorine oxidizing agent and an added catalyst, such that remainings of the soluble substances are further oxidized, and such that the chlorine-containing oxidizing agents formed during the first stage are catalytically reduced; wherein, the first stage and the second stage act synergistically to purify the wastewater from the soluble substances.

24 Claims, 1 Drawing Sheet

METHOD FOR PURIFICATION OF WASTEWATER FROM SOLUBLE SUBSTANCES

This is a continuation-in-part of U.S. Pat. application No. 08/529,824, filed Sep. 18, 1995, now abandoned.

FIELD AND BACKGROUND OF THE INVENTION

The present invention relates to a method for purification of wastewater from soluble substances and, more particularly, to a two stages electrocatalytic method for oxidative-purification of wastewater from soluble substances, such as toxic chemical admixtures difficult of oxidation, including dye-stuffs, detergents, phenols, cyanides and the like, which stages inactivate the soluble substances present in the wastewater in a synergistic fashion and, therefore, the method is highly efficient.

The first stage of the method for purification of wastewater from soluble substances includes wastewater electrochemical oxidation treatment in an elecrolizer having insoluble electrodes, in presence of chlorine ions (i.e., $Cl^-$) that form chlorine containing oxidizing agents. The second stage of the method for purification of wastewater from soluble substances includes a catalytic oxidation of the remaining pollutants present in the wastewater treated electrolytically according to the first stage above, by non-chlorine oxidizing agents, in the presence of an added catalyst. The term 'added catalyst' is used in the specification and in the claims to distinguish the present invention from cases where a catalitic reaction takes place without the external addition of catalyst of choice.

As mentioned, the first and the second stages of the method of the present invention for purification of wastewater from soluble substances act sinergistically to purify wastewater from soluble pollutants. Therefore, the method of the present invention provides effective means of wastewater purification from soluble substances, resulting in substantially total wastewater decolorization, detoxification and deodoration, characterized by a minimal catalysts consumption.

Water pollution is an ever expanding problem of the modern world. Various highly toxic water pollutants are produced by various industries such as, for example, the textile and knitted goods industry, the dye-stuffs industry, the chemicals industries, the pharmaceutical industry, the laminate (e.g., press boards) industries and, many other water polluting industries. Other water polluting sources are also known. As the scope of water pollutants production increases worldwide, there is an ever growing need for efficient and economic wastewater purification methods, due to the dangers imposed by water pollutants on our biological sphere.

Many wastewater purification methods were developed over the years. These include, for example, coagulating, flocculation, liquid phase oxidation, ultra- and hiperfiltration, absorption, ion exchange, reverse osmosis and, other methods. Nevertheless, some of these methods can not guarantee optimal results and, furthermore, these methods require much energy and/or are high in depolluting agents consumption and, therefore, are too expensive and/or produce additional undesired waste products, water pollutants themselves.

For example, the installation of coagulation and flocculation with further phase separation by sedimentation or floating is some times used for wastewater purification. However, such installations are not efficient enough and produce vast amounts of sludge, that has to undergo further detoxification. In addition, detergents are nearly impossible to separate by coagulation and flocculation and, cyano-compounds cannot be detoxificated all together by these methods. Furthermore, when methods such as absorption, ion exchange, reverse osmosis and ultra-filtration are employed, a conversion, rather than detoxification of the water pollutants is obtained, for example, by physical or chemical processes such as absorption of pollutants on a sorbent or concentrating the pollutants in rejected waters. Thus, while employing these methods, the problem of water pollutants accumulation is left unsolved.

Catalytic oxidation methods for wastewater treatment employing oxidizing agents such as chlorine and its oxygen-containing compounds (e.g., hypochlorite), ozone and hydrogen peroxide have been developed and studied. Oxidation typically leads to the destruction of toxic compounds producing simpler non-toxic substances that may be further subjected to biochemical treatments.

While using chlorine oxidation, strong oxidant chlorine $(Cl_2)$, and its oxygen-containing compounds are used for the oxidative-destruction of biochemically stable organic and inorganic substances. For example, phenol is oxidized by hypochlorous acid and hypochlorite ions, yielding carbonic acids, whereas cyanides are oxidized to non-toxic cyanates. It should, however, be noted, that despite the fact that water chlorination installations are compact and, chlorine and its oxygen-containing compounds are available, these installations are applied very rarely for wastewater purification for number of reasons: (a) the process is not a fall detoxification and some times produces toxic compounds; (b) the process is characterized by low (i.e., incomplete) oxidation, a possibility of toxic organochloric compounds formation and, high concentration of active residual chlorine which requires further water dechlorification.

The use of ozone and hydrogen peroxide oxidation for wastewater purification is limited by their high cost and complexity of process control due, for example, to high reactivity of ozone. Furthermore, the degree of mineralization of aromatic hydrocarbons is very low because during, for example, ozonation, mainly N=N bonds are broken, rather than, for example, aromatic rings.

Electrochemical water purification is one of the most efficient answers to the limitations associated with the wastewater treatments described hereinabove. In general, electrochemical wastewater purification methods are performed by running the wastewater to be purified through an electrolytic electrolyzer cell, in which cell oxidation of the pollutants occur. See, for example, U.S. Pat. Nos. 1,139,778; 3,616,355; 3,756,933; 3,764,500; 3,766,033; 3,856,642; 3,925,176; 3,939,499; 3,943,044; 3,975,247; 3,975,256; 4,009,104; and 4,075,314.

Other electrochemical methods directed at water purification from stable compounds, such as phenols, cyanides, organic dye-stuffs, synthetic detergents and the like, involve the use of an insoluble electrodes electrolyzer in chlorine ions presence. For examples see U.S. Pat. Nos. 4,445,990; 4,761,208; 5,108,563; 5,288,373; and 5,364,509. According to these methods, oxidizing agents, such as, for example, hypochlorite ions are synthesized in the electrolytic cell from chlorine ions added to the wastewater, or, preferably ions that are included in the wastewater to begin with. Further according to these methods, the oxidation of the wastewater pollutants begins in the electrolytic cell, where it is still intensified by the pre-electrode processes, nevertheless, the oxidation continues outside of the cell, by thus electrolytically synthesized oxidizing agents.

However, these methods has the following disadvantages: (1) incomplete oxidative-destruction of the water polluting substances; and (2) the formation of a new water pollutant, these are non-reacted oxidizing agents, especially hypochlorite ions, which remain dissolved in thus purified wastewaters.

Similar ways of wastewater purification, using similar electrochemical methods, combined with partial recirculation of the treated water (U.S. Pat. Nos. 4,029,557; 4,179,347; and 5,190,659), to prolong the interaction of the water with the oxidizing agent (U.S. Pat. Nos. 4,072,596; 4,131,526; 4,179,347; 4,218,315; 4,292,175; and 4,732,688) were also reported. The recirculation is accompanied by a catalytic destruction of the oxidizing agents which did not react during the first cycle of the electrochemical oxidation. The products of the destruction of the oxidizing agents (e.g., atomic oxygen) contribute to the water polluting substances oxidation efficiency. Nevertheless, high catalyst consumption is the main disadvantage of these methods as well as insufficient wastewater decolorization, detoxification and deodoration efficiency.

An electrocatalytic method of wastewater purification (U.S. Pat. No. 5,308,507), providing a good quality purification as a result of oxidizing agents formation in the electrolytic cell, both non-chlorine and chlorine-containing oxidizing agents, such as, for example, hypochlorite ions and hypochlorous acid and, ozone and hydrogen peroxide, respectively, was also reported. Nevertheless, this method has few disadvantages associated with the simultaneous formation of the non-chlorine and chlorine-containing oxidizing agents, especially ozone and peroxide, due to the synthesis processes taking place in the treated wastewater. These include: (a) inability to control the correlation (i.e., ratio) of the two types of oxidizing agents which can not be varied; and, as a result (b) optimization and control of the process are more difficult; and (c) catalyst consumption minimization is not applicable.

There is thus a widely recognized need for, and it would be highly advantageous to have, an electrocatalytic method for purification of wastewater from soluble substances, such as toxic chemical admixtures difficult of oxidation including dye-stuffs, detergents, phenols, cyanides and the like, devoid of the above mentioned limitations. The electrocatalytic method of the present invention, directed at purification of wastewater from soluble substances, has two successive stages, which stages act sinergistically to purify wastewater from soluble pollutants. Therefore, the method of the present invention provides effective and economic tool for wastewater purification from pollutants, resulting in total water decolorization, detoxification and deodoration, characterized by minimal catalysts consumption.

SUMMARY OF THE INVENTION

According to the present invention there is provided a two stages electrocatalytic method for oxidative-purification of wastewater from soluble substances, such as toxic chemical admixtures difficult of oxidation, including dye-stuffs, detergents, phenols, cyanides and the like, which stages inactivate the soluble substances present in the wastewater in a synergistic fashion and, therefore, are highly efficient.

According to further features in preferred embodiments of the invention described below the method comprising the steps of (a) in a first stage, electrochemically treating the wastewater in the presence of chlorine ions, such that chlorine-containing oxidizing agents are formed and at least partially oxidize the soluble substances in the wastewater; and (b) in a second stage, catalytically treating the first stage treated wastewater in presence of a non-chlorine oxidizing agent and an added catalyst, such that remainings of the soluble substances are further oxidized, and such that the chlorine-containing oxidizing agents formed during the first stage are catalytically reduced; wherein, the first stage and the second stage act synergistically to purify the wastewater from the soluble substances.

According to still further features in the described preferred embodiments the method further comprising the step of (c) re-electrochemically treating at least a part of the wastewater electrochemically treated in the first stage, before treating the at least a part of the wastewater in the presence of the non-chlorine oxidizing agent, in the second stage.

According to still further features in the described preferred embodiments the part is 10%–90% of the volume of the wastewater.

According to still further features in the described preferred embodiments the chlorine-containing oxidizing agents are selected from the group consisting of hypochlorite ions, hypochlorous acid and hypochloric acid.

According to still further features in the described preferred embodiments the non-chlorine oxidizing agents are selected from the group consisting of ozone, hydrogen peroxide and a combination of ozone and hydrogen peroxide.

According to still further features in the described preferred embodiments the first stage and the second stage are performed in a continues flow.

According to still further features in the described preferred embodiments the continues flow is of 0.1–200 cubic meters per hour.

According to still further features in the described preferred embodiments the soluble substances are selected from the group consisting of organic compounds, non-organic compounds and mixtures of organic compounds and non-organic compounds.

According to still further features in the described preferred embodiments the organic compounds are selected from the group consisting of phenols, detergents, pesticides, dyes and ammonia compounds.

According to still further features in the described preferred embodiments the non-organic compounds are selected from the group consisting of cyanides and ammonia compounds.

According to still further features in the described preferred embodiments the first stage is performed in an electrolyzer, the electrolyzer including insoluble electrodes.

According to still further features in the described preferred embodiments a current density of 10 to 1,000 Ampers per square meter is applied to the insoluble electrodes.

According to still further features in the described preferred embodiments the second stage is performed in a reactor.

According to still further features in the described preferred embodiments the reactor is an adsorbent catalyzer column.

According to still further features in the described preferred embodiments the added catalyst includes at least two oxides of at least one metal selected from the VIIb–VIII groups of the periodic table.

According to still further features in the described preferred embodiments the at least one metal is selected from the group consisting of Fe, Mn, Co, Ru, Ni, Pt and Os.

According to still further features in the described preferred embodiments one of the at least two oxides is of a higher oxidation state, whereas the other is of a lower oxidation state.

According to still further features in the described preferred embodiments the oxide of the higher oxidation state is selected in the range of 55%–85% by mass, whereas the oxide of the lower oxidation state is selected in the range of 45%–15% by mass, respectively.

According to still further features in the described preferred embodiments the oxide of the higher oxidation state is selected in the range of 65%–75% by mass, whereas the oxide of the lower oxidation state is selected in the range of 35%–25% by mass, respectively.

According to still further features in the described preferred embodiments the oxide of higher oxidation state is selected from the group consisting of $MnO_2$, $CO_2O_3$ and $Fe_2O_3$.

According to still further features in the described preferred embodiments the oxide of lower oxidation state is selected from the group consisting of MnO, CoO and FeO.

According to still further features in the described preferred embodiments the added catalyst is in a form of grains.

According to still further features in the described preferred embodiments the grains have a diameter ranging been 100 μm and 6 mm.

According to still further features in the described preferred embodiments the grains are massive.

According to still further features in the described preferred embodiments the grains include an inner catalyst carrier coated with an active layer of the catalyst.

According to still further features in the described preferred embodiments the inner catalyst carrier includes a material selected from the group consisting of activated carbon and aluminum γ-oxide.

The present invention successfully addresses the shortcomings of the presently known configurations by providing a two stages electrocatalytic method for oxidative destruction of soluble substances in wastewater, which stages act sinergistically and, therefore, more efficiently in inactivating wastewater pollutants which are, otherwise, difficult for oxidation; and act profoundly and, therefore, more efficiently in removing active chlorine compounds from the treated wastewater. Furthermore, the method of the present invention provides means to maintain reagent consumption at a minimal level, yet to obtain optimal purification results, therefore, the method of the present invention is highly economic. Separating the wastewater to two successive stages, enables an easy control on the amount of non-chlorine oxidizing reagents applied during the second stage, to avoid the formation of compounds with the highest oxidizing capabilities, such as chlorate and perchlorate, which formation is kept to a minimal level, while at the same time, the non-reacted chlorine-containing oxidizing agents are almost fully destroyed and so are the wastewater pollutants. Wastewater purification employing the electrocatalytic method of the present invention is performed fast relative to conventional catalytic methods.

BRIEF DESCRIPTION OF THE DRAWINGS

The invention herein described, by way of example only, with reference to the accompanying drawing, wherein.

DESCRIPTION OF THE PREFERRED EMBODIMENTS

Figure 1:
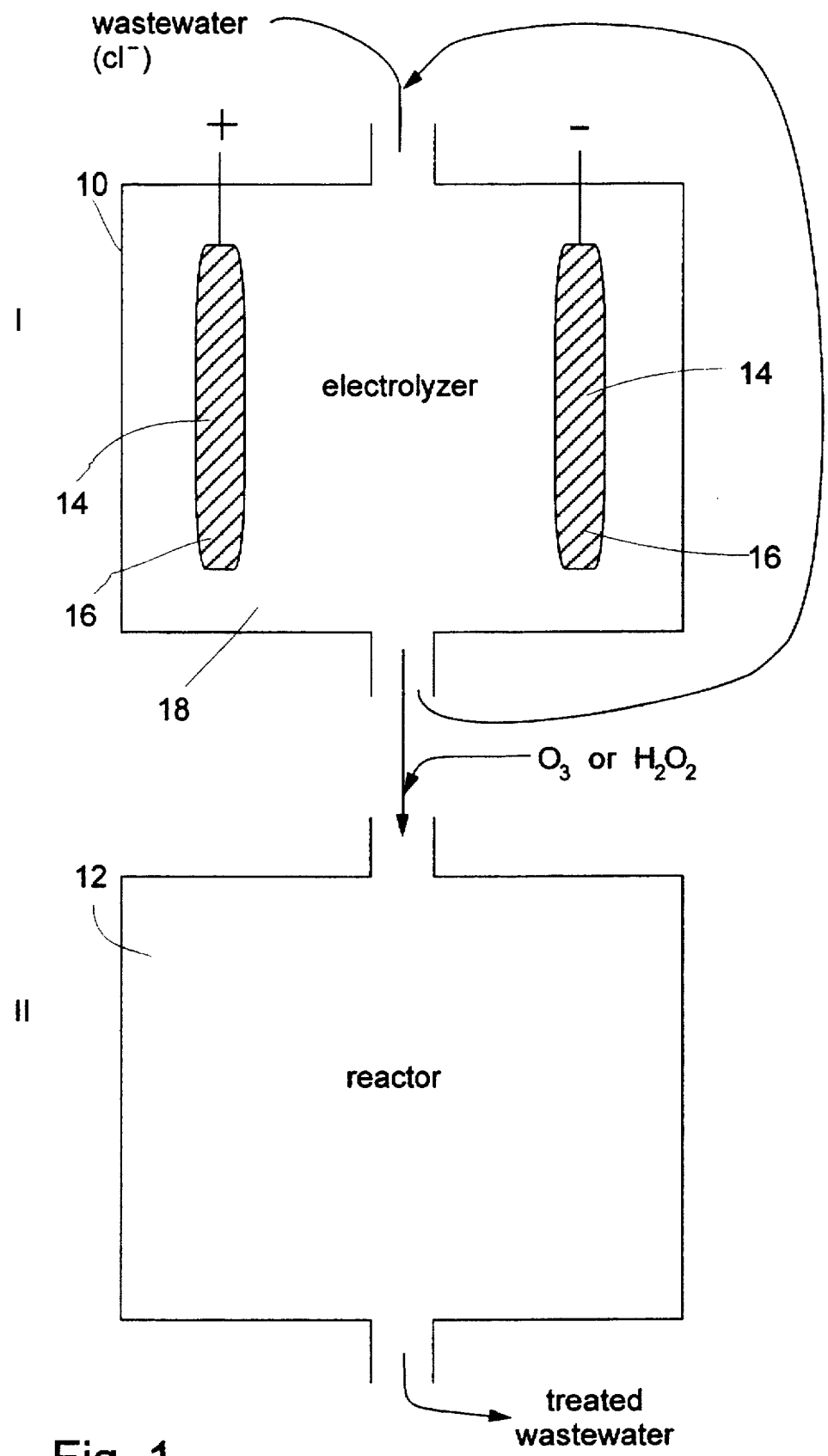
FIG. 1 is a schematic depiction of the general flow of wastewater along the two stages of the method of the present invention.

The present invention is of a two stages electrocatalytic method for oxidative destruction (i.e., decomposition, inactivation) of soluble substances in wastewater. Specifically, the present invention can be used to detoxify wastewater from pollutants, such as toxic chemical admixtures difficult of conventional oxidation, including dyestuffs, detergents, phenols, cyanides, etc. The two stages of the electrocatalytic method of the present invention inactivate (i.e., destroy, decompose) soluble substances present in the treated wastewater in a synergistic fashion which is, therefore, efficient in pollutants destruction and in reagents consumption and, therefore, is also economic. Furthermore, the resultant treated wastewater are relatively low in non-reacted chlorine-containing oxidizing agents and, the whole process of the method of the present invention is carried out relatively fast.

The principles and operation of a two stages electrocatalytic method for oxidative destruction of soluble substances in wastewater according to the present invention may be better understood with reference to the drawing and accompanying descriptions and examples.

Referring now to the drawing, FIG. 1 illustrates the general flow of wastewater along the two successive stages of the method of the present invention. The first stage is electrochemical, taking place in an electrolyzer 10, whereas the second stage is catalytic, in presence of an added catalyst, taking place in a reactor 12.

In the first stage of the method of the present invention, marked as I in FIG. 1, the wastewater are treated electrochemically in an electrolyzer 10 with insoluble electrodes 14. The first stage is accompanied by the formation of oxygen-containing chlorine compounds (i.e., chlorine-containing oxidizing agents), such as hypochlorite ions and hypochlorous acid, which are relatively strong oxidizing agents, capable of oxidizing dies, phenols ,detergents, cyanides and other polluting substances which are, otherwise, difficult of destruction. The formation of oxygen-containing chlorine compounds is taking place on the electrodes 14 surface 16 in part and, in solution 18 in part, wherein the chlorine is contributed by chlorine ions (Cl-) present in the wastewater prior to any treatment. Nevertheless, in cases where the concentration of chlorine ions in the wastewater is low, chlorine ions may be added to the wastewater prior to treatment.

There are two main processes on insoluble anodes (+, in FIG. 1) in aqueous solutions containing chlorine ions ($Cl^-$):

(a) Oxidation of chlorine ions:

$$2Cl^- - 2e^- \rightarrow Cl_2 \qquad (1)$$

(b) Oxygen evolution: in acidic solution:

$$2H_2O - 4e^- \rightarrow O_2 + 4H^+ \qquad (2)$$

in alkaline solution:

$$4OH^- - 4e^- \rightarrow O_2 + 2H_2O \qquad (3)$$

The resulting molecular chlorine ($Cl_2$, Equation 1) is hydrolyzed, yielding hypochlorous and hypochloric acids:

$$Cl_2 + H_2O \rightarrow HClO + H^+ + Cl^- \qquad (4)$$

$$Cl_2 + OH^- \rightarrow HClO + Cl^- \qquad (5)$$

The hypochlorous acid (HClO) interacts with near-cathodic alkali ions ($OH^-$ a to form hypochlorite ions ($ClO^-$):

$$HClO + OH^- \rightarrow ClO^- + H_2O \quad (6)$$

Electrochemically generated hypochlorous acid (HClO) and hypochlorite ions (ClO$^-$) are strong oxidizing agents enabling a degradative liquid phase oxidation of wastewater pollutants.

For example, the oxidation of organic compounds is shown in general in Equation 7.

$$OH^- + |HClO + ClO^-| + R{-}H \rightarrow 2Cl^- + R'{-}H + CO_2 + H_2O + |\text{inorganic reaction products}| \quad (7)$$

As can be seen from Equation 7, chlorine ions (Cl$^-$) participate repeatedly in the electrochemical degradation process. They are discharged anodically (Equation 1), the resulting chlorine (Cl$_2$) is hydrolyzed with the oxidizing agents formation (Equations 4–6), themselves participate in various redox reactions, such as the one shown in general in Equation 7, yielding chlorine ions which repeatedly participate in the electrochemical synthesis of the chlorine-containing oxidizing agents.

As is exemplified hereinbelow in Table II and its accompanying description in Example 7, comparing the efficiency of the first stage of the electrocatalytic method of the present invention in inactivating pollutants in wastewater, to the efficiency of a simple catalytic method, in which oxygen-containing chlorine compounds are simply added to the wastewater, results in a substantially higher efficiency of the first stage of the method of the present invention, relative to the simple catalytic method. In addition, the time required to obtain these efficiencies is ca. 30 fold longer for the simple catalytic method, as compared with the first electrochemical stage of the electrocatalytic method of the present invention. These phenomena are not surprising considering the cycling of chlorine between Cl$^-$ ions and chlorine-containing oxidizing agents, as delineated hereinabove.

In addition to the liquid phase oxidation of wastewater pollutants by electrochemically formed chlorine-containing oxidizing agents, electroreduction of organic substances also occurs. This process is associated with hydrogen production on the electrodes. For this reason reductants of different nature are distinguished: electrons, ions or hydrogen atoms. Molecules of organic substances (R) often participate directly in the electrochemical reaction on the cathode, and are transformed to anions (R$^-$):

$$R + e^- \rightarrow R^- \quad (8)$$

A subsequent stage of the process is anion neutralization leading to the formation of hydration product radicals (RH•):

$$R^- + H^+ \rightarrow RH\bullet \quad (9)$$

Simultaneous destruction of organic molecule substances by hydrogen ions (H$^+$) is also possible:

$$R + H^+ + e^- \rightarrow RH\bullet \quad (10)$$

At a sufficiently high cathode potential, free radicals are formed as reaction intermediates. The radicals formed are responsible for high reactivity of organic and inorganic compounds.

Electrooxidation processes of wastewater pollutants occur with more difficulty than the electroreduction processes described hereinabove. In a number of cases electrooxidation is governed by electron mechanism, i.e., the oxidized substance absorbs on the anode and transfers electrons with a concurrent or preceding dehydradation:

$$R{-}H - e^- \rightarrow R\bullet + H^+ \quad (11)$$

A subsequent transformation of the organic radicals (R•) thus formed, is determined by their reactivity. For example, a complete anodic oxidation of formaldehyde occurs to yield hydrogen and carbon dioxide (CO$_2$). As shown in Equation 12 below, the oxidation is due to both OH• radicals and hydrogen peroxide:

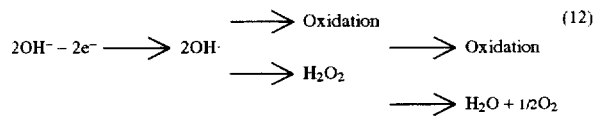

In most cases, cathodic reduction and anodic oxidation promote destabilization of organic and inorganic compounds, which destabilization noticeably speeds up reactions in the volume in the interelectrode space (i.e., liquid phase), under the action of electrolysis products.

These electrochemical oxidation-reduction processes of wastewater pollutants further account for the efficiency of the first stage of the electrocatalytic method of the present invention in inactivating pollutants in wastewater, relative to the efficiency of a simple catalytic method in which oxygen-containing chlorine compounds are simply added to the treated wastewater. In addition, these oxidation-reduction processes also contribute to the high speed, characterizing the first stage of the electrocatalytic method of the present invention, as compared to the simple catalytic method.

Thus, during electrolysis in the presence of Cl$^-$ ions, soluble substances in wastewater are destructed due to both direct electrochemical redox processes and chemical oxidation by anode-synthesized oxidizing agents, taking place in the volume of the treated wastewater solution.

As further shown in FIG. 1, in a preferred embodiment, part of the first stage treated wastewater coming out of electrolyzer 10 are recycled through the first stage, where they are mixed with yet untreated wastewater. This results in a prolonged contact of the oxidizing agents, formed in the electrolyzer, with the polluting substances in the wastewater and, therefore, increases the first stage oxidation efficiency and thus, contributes to the efficiency of the whole purification process.

In the second stage of the method of the present invention for purification of wastewater from soluble substances, marked as II in FIG. 1, the wastewater which were electrochemically oxidized, as described hereinabove, are catalytically oxidized by non-chlorine oxidizing agents, such as, for example, ozone (O$_3$) or hydrogen peroxide (H$_2$O$_2$) in the presence of an added catalyst. It is presently preferred that a liquid phase heterogeneous catalytic oxidation will be performed as the chemical oxidation process of the second stage and, will take place in a granulated adsorbent catalyzer column. The non-chlorine oxidizing agents, such as ozone and/or hydrogen peroxide, are preferably added just before the wastewater arrival to the column and the mixture of the non-chlorine oxidizing agent and the wastewater stirred intensively.

As mentioned, the industrial wastewater treated in the electrolyzer during the first stage of the method of the present invention are directed to the reactor in which the second stage is performed, which second stage includes heterogeneous oxidation-reduction processes intended for final purification and dechlorination of the wastewater.

The necessity to develop a two-stage process is due to the following reasons: In the electrolyzer, where an electrically generated oxidizing agents are formed in a stoichiometric amount or in a slight excess, only easily oxidizable parts of toxic compounds present in the treated wastewater are destructed because of insufficient oxidation potential characterizing these oxidizing agents. For example, the redox potential of hypochlorite is 1.49 Volt. Thus, oxidative degradation is not sufficiently completed. To achieve a complete purification during the first stage itself, electrolysis must be carried out at parameters providing a significant excess of oxidizing agents. Nevertheless, this would lead to a considerable increase of electrical power consumption and to accumulation of surplus oxidizing agents in the treated wastewater solution. It is well known that oxidation in solutions containing oxygenated chlorine compounds is due to preliminary activated oxygen (by decomposition of hypochlorite ion or hypochlorous acid). It is, therefore, reasonable to use decomposition of oxygenated chlorine compounds in order to intensify the purification process.

According to the method of the present invention, this goal is achieved due to catalytic decomposition of hypochlorite ions and hypochlorous acid, in which free active radicals (ClO•, Cl•, OH• and O•) are formed and subsequently interact with oxidizable substances.

The process can be described as follows:

$$HClO^- + ClO^- \longrightarrow K\begin{matrix} ClO^- \\ HClO \end{matrix} \quad (13)$$

where K is the added catalyst.

The decomposition of the intermediate complex is accompanied by ClO• radical formation, while the catalyst returns to its initial stage:

$$K\begin{matrix} ClO^- \\ HClO \end{matrix} \longrightarrow ClO\cdot + H\cdot + 2O\cdot + 2OH^- + K \quad (14)$$

ClO• radicals take part in reactions of atomic oxygen and OH• radicals formation:

$$ClO\cdot + ClO^- + OH^- \rightarrow 2Cl^- + 2O\cdot + OH\cdot \quad (15)$$

Further development of the process is promoted by Cl radicals formation:

$$OH\cdot + Cl^- \rightarrow Cl\cdot + OH^- \quad (16)$$

The free radicals thus formed and atomic oxygen react with oxidizable substances:

$$RH_2 + OH\cdot \rightarrow RH\cdot + H_2O \quad (17)$$

$$RH_2 + Cl\cdot \rightarrow RH\cdot + Cl^- + H^+ \quad (18)$$

$$RH_2 + O\cdot \rightarrow RH\cdot + OH^- \quad (19)$$

where R stands for organic substances.

As a result, reoxidation of the electrochemical oxidizing agents formed during the first stage of the method of the present invention occurs, which reoxidation enhances the effectiveness of the wastewater purification process and ensures complete dechlorination (i.e., reduction of hypochlorite ion and hypochlorous acid).

The correlation (i.e., the ratio) between the second stage added non-chlorine oxidizing agent (e.g., ozone or hydrogen peroxide) and the non-reacted chlorine-containing oxidizing agents (e.g., hypochlorite ion and hypochlorous acid), formed in the electrolyzer during the first stage, is maintained at a value providing a synergetic effect of the oxidizing mixture during the second stage process, which process is, therefore, providing a final polishing by catalytic oxidation of the pollutants contained in the treated wastewater.

Furthermore, maintaining an optimal correlation between the second stage added non-chlorine oxidizing agent (e.g., ozone or hydrogen peroxide) and the first stage non-reacted chlorine-containing oxidizing agents (e.g., hypochlorite ion and hypochlorous acid), formed in the electrolyzer, leads to a chemical transformation of the non-reacted chlorine-containing oxidizing agents, in an oxidation-reduction process taking place during the second stage, specially when ozone is employed as the non-chlorine oxidizing agent. Therefore, the formation of compounds with the highest oxidizing capabilities, such as chlorate and perchlorate, is kept at a minimal level, while at the same time, the non-reacted chlorine-containing oxidizing agents are almost fully destroyed. Simultaneously the process of catalytic oxidation of the residual pollution substances and their degradation products is taking place.

The synergistic effect mentioned hereinabove, which is exemplified in Example 7, hereinbelow, further contributes to the total efficiency of the method of the present invention in inactivating pollutants in wastewater. One possible explanation to this synergistic effect is, as already stated hereinabove, an electrolytic formation of activated products by electrochemical reduction and destruction of the pollutants themselves, when treated electrochemically under the above described conditions of the first stage.

Furthermore, as further exemplified in Example 7, the content of nonreacted chlorine-containing oxidizing agents is also synergistically lowered when wastewater are treated according to the present invention, the formation of activated products may account to this phenomenon as well.

Employing the method of the present invention for wastewater treatment results in substantially total decolorizing, detoxification and deodoration of the treated wastewater. Furthermore, it was tested and found that, while using the method of the present invention for wastewater purification, catalyst consumption is reduced at least four times as compared to catalyst consumption when conventional methods are employed.

As stated above, the two stages of the electrocatalytic method of the present invention, act sinergistically both in the oxidative inactivation of soluble substances in wastewater and profoundly in removing chlorine-containing oxidizing agents from the resultant treated water. These synergism and profound phenomena are herein reported for the first time and results in high efficiency of the wastewater purification process thus described.

The removal of the first stage chlorine-containing oxidizing agents by the non-chlorine oxidizing agent added in the second stage of the method of the present invention typically follows reactions 20 and 21 below.

$$HClO + ClO^- + H_2O_2 \rightarrow 3/2\ O_2 + 2Cl^- + H_2O + H^+ \quad (20)$$

$$HClO + ClO^- + 2O_3 \rightarrow 4O_2 + 2Cl^- + H^+ \quad (21)$$

The molar ratio between the concentrations of the second stage non-chlorine oxidizing agent (e.g., ozone or hydrogen peroxide) and the first stage (unreacted) chlorine-containing oxidizing agents, most suitable for providing a synergetic effect as hereinabove described, was experimentally determined for ozone and hydrogen peroxide to be as follows.

When using ozone ($O_3$)—1: (4–35); optimally 1: (8–12). When using hydrogen peroxide ($H_2O_2$)—1: (4–12); optimally 1: (7–9).

When the value of the concentration ratio of the second stage oxidant is raised above 1:4 for ozone or hydrogen peroxide, the purification efficiency is remarkably reduced, suggesting that a crucial role is played by redox reactions between the first stage active chlorine-containing oxidizing agents and the second stage non-chlorine oxidizing agents.

Under such conditions these reactions lead to lower oxygen activity which, in turn, results in practically no oxidation of organic compounds.

When, on the other hand, the concentration ratio is decreased to values lower than 1:35 for ozone and 1:12 for hydrogen peroxide, the efficiencies of both the second stage catalytic process and the purification of the first stage residual chlorine-containing oxidizing agents are both remarkably reduced. A possible explanation to these phenomena may be that the amount of the second stage non-chlorine oxidizing agent is sufficient only for the heterogeneous reactions to proceed yet not to completion, due to the shortage in oxidants.

Presumably the synergetic effect between the first and second stages of the method of the present invention in wastewater purification takes place due to oxygen compounds of chlorine which provide a generous source of radicals in the heterogeneous catalytic reduction, while hydrogen peroxide or ozone are involved in reactions of catalytic homogeneous-heterogeneous development and chain continuation in forked radical chain oxidation processes of organic and inorganic compounds.

The added catalyst which is present during the second stage of the method of the present invention plays a double role. On one hand, it serves as a catalyst for the chlorine containing oxidizing agents formed during the first (i.e., electrochemical) stage reduction, proceeding through a free radicals mechanism, whereas, on the other hand, it catalyses the oxidation of organic and inorganic compounds by the products of the catalytic reduction of the first stage chlorine-containing oxidizing agents and the second stage non-chlorine oxidizing agent (e.g., ozone or hydrogen peroxide).

The active ingredient of the catalyst includes oxides of different oxidation states of at least one of the metals belonging to the VIIb–VIII groups of the periodic table, in particular, Fe, Mn, Co, Ru, Ni, Pt and Os.

As was experimentally determined, for obtaining the described synergetic effect between the first and second stages of the method of the present invention, it is essential to select the metal oxide in the catalyst to poses different (i.e., higher and lower) oxidation states. The amount of oxide having the higher oxidation state (e.g., $MnO_2$, $Co_2O_3$, $Fe_2O_3$, etc.) is preferably selected in the range of 55%–85%, whereas the amount of oxide having the lower oxidation state (e.g., MnO, CoO, FeO, etc.) is selected, accordingly, in the range of 45%–15% by mass. Best results are obtained when the higher oxide in the catalyst is in the range of 65%–75% by mass. Mixtures of metal oxides also perform well.

The metal oxides of the higher oxidation state predominantly catalyze the reduction of the first stage chlorine-containing oxidants, while metal oxides of the lower oxidation state catalyze the second stage catalytic oxidation of the organic and inorganic compounds present in the wastewater.

Preferably, the catalyst is added to the reaction column in the form of grains with effective diameter ranging from 100 μm to 6 mm.

The catalyst grains are either massive oxide mixture or in the form of a catalyst carrier coated with an active layer of the desired metal oxides mixture. Typically, the content of the active catalytic coat applied onto the catalyst carrier ranges between 0.5% and 20%, by mass.

Catalyst grains in the form of a massive metal oxide mixture are derived from nitrate solutions of the appropriate salts by means of thermal decomposition of the salts followed by granulation.

If so desired, the active layer is applied onto the carrier by means of impregnating the latter in a solution containing a mixture of nitrate metal salts followed by heat treatment in an oxygen-free atmosphere.

Activated carbon or aluminum γ-oxide may be used as the catalyst active layer carriers.

The following examples demonstrate the synergistic effects imposed by the two stages of the method of the present invention for wastewater purification and the efficiency of the process.

EXAMPLE 1

Dying industry wastewater with chemical oxidation demand (COD) of 2,000 ppm (mg/l), containing 100 ppm of organic dye-stuffs and 5 grams per liter chloride ions were treated in an insoluble electrodes electrolyzer with current density of 150 Amp/$m^2$. 40% of the wastewater coming out of the electrolyzer were redirected to the preliminary mixing chamber, where they were mixed with yet untreated wastewater. The remaining (60%) wastewater that were coming out of the electrolyzer were measured and found to contain 200 ppm active chlorine. The average retention time in the electrolyzer was three minutes. The wastewater were than mixed with ozone in 1:10 proportion (in moles, relative to the active chlorine). The mixture was stirred intensively and was directed to a granulated adsorbent catalyzer reaction column, which contained a catalyst on the basis of the VII–VIII groups oxide elements, for the fmal catalytic oxidation, which prolonged four minutes.

The water coming out of the column had the characteristics listed in Table I below.

TABLE I

| | |
|---|---|
| COD: | 248 ppm |
| Color | colorless |
| Active chlorine | 0.2 ppm |
| Dissolved Organic Halogen (DOX): | non detectable |

EXAMPLE 2

The conditions were kept similar to those described hereinabove under Example 1, but the ozone dosage employed was raised 2.5 fold (1:4 proportion, in moles). Nevertheless, raising the ozone dosage had no measurable effect on the treated wastewater characteristics, which were similar to those obtained under the conditions of Example 1 above, wherein the ozone consumption was more than twice as small.

EXAMPLE 3

The conditions were kept similar to those described hereinabove under Example 1, but hydrogen peroxide instead of ozone was used in 1:7 proportion (moles). The water characteristics were similar to those obtained under the conditions of Examples 1 and 2.

EXAMPLE 4

The conditions were kept similar to those described hereinabove under Example 1, but the ozone dosage employed was raised 10 fold (1:1 proportion, in moles). This resulted in the formation of chlorates and perchlorates. The purified water contained active chlorine at the amount of 70 ppm.

EXAMPLE 5

The conditions were kept similar to those described hereinabove under Example 3, but the hydrogen peroxide was used in 1:50 proportion (moles). The water characteristics were similar to those obtained under the conditions of Examples 1, 2 and 3, although a seven fold less added catalyst amount, as compared with Example 3 above, was used.

EXAMPLE 6

The conditions were kept similar to those described hereinabove under Example 1, but the wastewater were directed for the final catalytic treatment without being previously mixed with non-chlorine oxidizing agent (e.g., ozone or peroxide). The water characteristics were similar to those obtained under the conditions of Example 1, but with four fold amount (i.e., 0.8 ppm) of active chlorine.

EXAMPLE 7

A comparative efficiency analysis of the electrocatalytic method of the present invention, in which chlorine-containing oxidizing agents formed electrochemically, are employed under a first stage, followed by added non-chlorine oxidizing agents, employed under a second stage (i.e., electrocatalytic method), in the presence of an added catalyst, relative to a method in which chlorine-containing oxidizing agents are added to the process (instead of being formed electrochemically) in the first stage (i.e., catalytic method), is presented. In this analysis two types of parameters were determined. The first type included the efficiency of each of the stages for each of the methods in inactivating wastewater pollutants as measured in ppm of COD and presented also in percentages, whereas the second type included determinations of the non-reacted chlorine-containing oxidizing agent concentrations remained in the treated wastewater after the first and the second stages of each of the wastewater treatment methods, measured in ppm. For comparative reasons, the experimental conditions, such as, for example, the amount of chlorine-containing oxidizing agents added to the treated wastewater at the first stage of the catalytic method, the electrical current density applied during the first stage of the electrocatalytic method of the present invention and, the time of incubation under these conditions, all were selected so that the concentration of chlorine-containing oxidizing agents in each of the compared experiments will be substantially similar when the first stage is completed. The experimental conditions and the results obtained are summarized in Table II below.

Referring now to table II, eight individual experiments (rows 1–8, Table II) were performed, for each of which wastewater with 1,800 ppm COD were treated ($COD_{(O)}$, column d, Table II). Referring now to experiments 1–4, Experiment 1 and 2 are of the catalytic method and, therefore, in their first stage, 2,000 ppm of chlorine-containing oxidizing agent (Hypochlorite added$_{(O)}$, column a) were mixed with the wastewater in the first stage and the mixture was stirred for 1.6 hr. (column c). Experiments 3 and 4 are of the electrocatalytic method and, therefore, in their first stage chlorine-containing oxidizing agent (column a) were not added, rather a current density of 200 Amp./m$^2$ (column b) was applied for 0.05 hr. (column c). In the second stage, 10 (experiments 1 and 3) or 30 (experiments 2 and 4) ppm of ozone or hydrogen peroxide (columns h and i) were added, respectively. The efficiencies of each of the first and the second stages and the total efficiency, for each experiment, were determined and are presented in percentages (columns f, k and l, respectively). The concentrations of non-reacted chlorine-containing oxidizing agents were determined prior and after the second stage and are presented in ppm in columns g and m, respectively. Similar analyses were performed using different amounts of reagents added and current applied (see Table II for details) were also performed (experiments 5–8).

TABLE II

| | Stage I | | | | | | | Stage II | | | | | |
|---|---|---|---|---|---|---|---|---|---|---|---|---|---|
| No. | a Hypochlorite added (O) (ppm) | b Amp./m$^2$ applied | c time (hr) | d COD (O) (ppm) | e COD (I) (ppm) | f Efficiency (I) (%) | g Hypochlorite (I) (ppm) | h ozone added (ppm) | i H$_2$O$_2$ added (ppm) | j COD (II) (ppm) | k Efficiency (II) (%) | L Total Efficiency (%) | m Hypochlorite (II) (ppm) |
| 1 | 2,000 | | 1.6 | 1,800 | 920 | 49 | 450 | 10 | | 580 | 37 | 68 | 1.3 |
| 2 | 2,000 | | 1.6 | 1,800 | 920 | 49 | 450 | | 30 | 640 | 30 | 64 | 1.7 |
| 3 | | 200 | 0.05 | 1,800 | 630 | 65 | 420 | 10 | | 190 | 70 | 89 | 0.3 |
| 4 | | 200 | 0.05 | 1,800 | 630 | 65 | 420 | | 30 | 220 | 65 | 88 | 0.4 |
| 5 | 1,000 | | 1.6 | 1,800 | 1,100 | 39 | 330 | 20 | | 750 | 32 | 58 | 0.7 |
| 6 | 1,000 | | 1.6 | 1,800 | 1,100 | 39 | 330 | | 20 | 900 | 18 | 50 | 1.4 |
| 7 | | 150 | 0.05 | 1,800 | 750 | 58 | 300 | 20 | | 330 | 56 | 82 | 0.2 |
| 8 | | 150 | 0.05 | 1,800 | 750 | 58 | 300 | | 20 | 380 | 49 | 79 | 0.3 |

Referring now to column k, in Table II. The efficiencies of pollutants destruction during the second stage using the method of the present invention (experiments 3, 4, 7 and 8) is ca. twice as much as the efficiency obtained using the catalytic method (experiments 1, 2, 5 and 6). As shown in column l, these efficiencies contribute to the total efficiency. As shown in column f, a further contribution to the total efficiency (shown in column l) is the efficiency of the first stage which is substantially higher for the electrocatalytic method (experiments 3, 4, 7 and 8) as compared with the catalytic method (experiments 1, 2, 5 and 6).

Referring now to columns g and m, comparing experiments 1 to 3, 2 to 4, 5 to 7 and 6 to 8, it is apparent that when the method of the present invention is employed, the concentration of non-reacted chlorine-containing oxidizing agents is 4–5 fold lower than when the catalytic method is employed.

It is also apparent from Table II, that the total amount of time to achieve the described efficiencies is much shorter since, as is apparent from column c, the first stage of the method of the present invention is 32 times shorter as compared with the catalytic method.

The results shown in Table II, demonstrate that the two stages of the electrocatalytic method of the present invention act synergistically in inactivating wastewater pollutants and profoundly in reducing non-reacted chlorine-containing oxidizing agents, whereas only a stoichiometric, less efficient effect is characterizing the equivalent stages of the catalytic method used for comparison. This is the first time wherein such synergism and efficiency are demonstrated, which contribute to the efficiency of wastewater purification.

Thus, the two stages of the electrocatalytic method of the present invention, for oxidative destruction (i.e., decomposition) of soluble substances in wastewater, addresses the treatment of wastewater better than existing methods in various aspects:

(1) The two stages of the method of the present invention act sinergistically and, therefore, more efficiently in inactivating wastewater pollutants which are, otherwise, difficult for oxidation.

(2) The two stages of the method of the present invention act profoundly and, therefore, more efficiently in removing active chlorine compounds from the treated wastewater.

(3) The method of the present invention provides means to maintain reagent consumption at a minimal level, yet to obtain optimal purification results, therefore, the method of the present invention is highly economic.

(4) Separating the wastewater to two successive stages, enables an easy control on the amount of non-chlorine oxidizing reagents applied during the second stage, to avoid the formation of compounds with the highest oxidizing capabilities, such as chlorate and perchlorate, which formation is kept to a minimal level, while at the same time, the non-reacted chlorine-containing oxidizing agents are almost fully destroyed and so are the wastewater pollutants.

(5) Wastewater purification employing the electrocatalytic method of the present invention is performed fast relative to conventional catalytic methods.

U.S. Pat. No. 3,719,570 to Lancy teaches an electrocatalytic method for purification of wastewater comprising electrochemically treating the wastewater in the presence of chlorine ions, including hypochlorous, and thereafter treating the first stage treated wastewater in the presence of a non-chlorine oxidizing agent, including ozone. Lancy further teaches that in the event that in the second step the oxidant is gas (e.g., ozone), the contact of same with the solution may be improved by means such as providing a packing in the oxidation cell and enclosing the cell in a container not open to atmosphere and/or by providing vigorous agitation and mixing of the waste solution. Packing elements, as taught by Lancy, are made of chemically inert materials, polyethylene is one example, used for providing increased contact area between pollutants and oxidizing agents. However, Lancy fails to teach the use of an added catalyst when treating the first stage treated wastewater in the presence of the non-chlorine oxidizing agent in the second purification stage.

U.S. Pat. No. 3,616,355 to Themy teaches that the combination of ozone and chlorine provides a synergistic biocidal action substantially exceeding that which could normally be attributed to the chlorine and ozone separately. However, like Lancy, Themy fails to teach the use of an added catalyst when treating the first stage treated wastewater in the presence of a non-chlorine oxidizing agent in the second purification stage. Yet, as exemplified hereinbelow the presence of an added catalyst in the second (catalytic) stage of the reaction acts much more sinergistically in removing pollutants from the treated wastewater. Furthermore, the presence of the added catalyst tremendously facilitates the reduction of the chlorine-containing oxidizing agents formed during the first stage of the method.

U.S. Pat. No. 4,470,891 to Moore teaches the addition of an inorganic peroxide to remove available chlorine compounds. However, like Lancy and Themy, Moore fails to teach the use of an added catalyst when treating the first stage treated wastewater in the presence of a non-chlorine oxidizing agent in the second purification stage. Yet, as mentioned above, and further exemplified below, the presence of the catalyst tremendously increases the reduction rate of the chlorine-containing oxidizing agents formed during the first stage of the method.

The following examples (Examples 8–13) demonstrate the importance of the added catalyst to the synergetic effect in removal of wastewater pollutants and the pronounced effect on removing remainings of available chlorine-containing oxidizing agents formed during the first (electrochemical) stage of the method according to the present invention.

EXAMPLE 8

Dying industry wastewater with chemical oxidation demand (COD) of 2.130 ppm (mg/l), containing 126 ppm organic dye-stuffs and 5 grams per liter chloride ions were treated in an insoluble electrodes electrolyzer with current density of 150 Amp/m$^2$. 45% of the wastewater coming out of the electrolyzer were redirected to the preliminary mixing chamber, where they were mixed with yet untreated wastewater. The wastewater coming out of the electrolyzer (at a rate of 7.5 l/hr) contained 280 ppm (mg/l) chlorine-containing oxidants.

The wastewater were thereafter vigorously mixed with ozone (ozone/first stage chlorine-containing oxidants molar ratio was 1:14). The resulting mixture of ozone-wastewater was fed into a column packed with coated catalyst grains having an effective diameter of 1.8 mm. The grains were coated with a mixture of 75% 25% by mass $Co_2O_3$ and NiO, respectively. The retention time in the catalytic reactor was 6 min.

The water coming out of the column had the characteristics listed in Table III below.

TABLE III

| COD: | 220 ppm |
|---|---|
| Color | colorless |
| Active chlorine | 0.17 ppm |
| Dissolved Organic Halogen (DOX): | non detectable |

EXAMPLE 9

The conditions were kept as detailed under Example 8 above, except that the catalyst was replaced by a catalytically inert charge of granular polyethylene having a grains effective diameter of 1.8 mm. Under these conditions the treatment yielded the results listed in Table IV below.

TABLE IV

| COD: | 580 ppm |
|---|---|
| Active chlorine | 270 ppm |

These results demonstrate that under these conditions following the second stage, the COD and the concentration of the remaining active chlorine formed during the first stage practically remained unchanged. Thus, in the absence of the added catalyst no synergism is observed between the first and second stages of the method of the present invention.

EXAMPLE 10

The conditions were kept as detailed under Example 8 above, except that the catalyst was replaced by a catalytically inert charge of glass beads having a diameter of 1.9 mm. Under these conditions the purification results were the same as described under Example 9 above.

EXAMPLE 11

The conditions were kept as catalytically under Example 8 above, except that the catalyst was replaced by grains of activated carbon having a mean effective diameter of 1.7 mm. During the first 8 hours of operation the activated carbon was observed to adsorb the organic compounds (the purified wastewater COD value exhibited logarithmic growth during 8 hours and then became asymptotic to a substantially horizontal line).

The results obtained after 8 hours under these conditions are presented in Table V below.

TABLE V

| COD: | 490 ppm |
|---|---|
| Active chlorine | 74 ppm |

In order to reduce the active chlorine concentration to a level lower than 0.3 ppm it was necessary to raise the retention time in the second stage reactor to 16.8 minutes (i.e., by a factor of 2.8). Under this condition the COD value was reduced only to 420 ppm.

EXAMPLE 12

The conditions were kept as detailed under Example 8 above, except that the catalyst was replaced by grains of nickel oxide (NiO) derived from heat treatment of nickel nitrate $Ni(NO_3)_2$ followed by granulation. The effective diameter of the grains was 1.6 mm.

Under these conditions, in order to obtain practically complete wastewater dechlorination (active chlorine concentration not exceeding 0.3 ppm) the retention time at the second stage had to be raised to 15.6 minutes, 2.6 fold more as compared with Example 8. Doing so resulted in a COD value of 308 ppm, 1.4 fold higher than in Example 8.

EXAMPLE 13

The conditions were kept as detailed under Example 8 above, except that the catalyst was replaced by grains of cobalt oxide ($Co_2O_3$) derived from heat treatment of cobalt nitrate $Co(NO_3)_3$ followed by granulation. The effective diameter of the grains was 1.6 mm.

Under these conditions the active chlorine concentration did not exceed 0.12 ppm while the COD of the purified wastewater was 480 ppm, i.e., 2.1 fold higher than in Example 8.

While the invention has been described with respect to a limited number of embodiments, it will be appreciated that many variations, modifications and other applications of the invention may be made.

What is claimed is:

1. An electrocatalytic method for purification of wastewater from soluble substances, the wastewater having a volume, comprising the steps of:

(a) in a first stage, electrochemically treating the wastewater in the presence of chlorine ions, such that chlorine-containing oxidizing agents are formed and at least partially oxidize the soluble substances in the wastewater; and (b) in a second stage, catalytically treating said first stage treated wastewater in presence of a non-chlorine oxidizing agent and an added catalyst, such that remainings of the soluble substances are further oxidized, and such that said chlorine-containing oxidizing agents formed during said first stage are catalytically reduced; wherein, said non-chlorine oxidizing agents are selected from the group consisting of ozone, hydrogen peroxide and a combination of ozone and hydrogen peroxide, such that if hydrogen peroxide is selected a molar ratio between said formed chlorine-containing oxidizing agents and said hydrogen peroxide is kept between 1–4 to 1–12, whereas if ozone is selected a molar ratio between said formed chlorine-containing oxidizing agents and said hydrogen peroxide is kept between 1–4 to 1–35, said first stage and said second stage act synergistically to purify the wastewater from the soluble substances.

2. A method as in claim 1, further comprising the step of:

(c) re-electrochemically treating at least a part of said wastewater electrochemically treated in said first stage, before treating said at least a part of said wastewater in said presence of said non-chlorine oxidizing agent, in said second stage.

3. A method as in claim 2, wherein said part is 10%–90% of said volume of said wastewater.

4. A method as in claim 1, wherein said chlorine-containing oxidizing agents are selected from the group consisting of hypochlorite ions, hypochlorous acid and hypochloric acid.

5. A method as in claim 1, wherein said first stage and said second stage are performed in a continuos flow.

6. A method as in claim 5, wherein said continuos flow is of 0.1–200 cubic meters per hour.

7. A method as in claim 1, wherein the soluble substances are selected from the group consisting of organic compounds, non-organic compounds and mixtures of organic compounds and non-organic compounds.

8. A method as in claim 7, wherein said organic compounds are selected from the group consisting of phenols, detergents, pesticides, dyes and ammonia compounds.

9. A method as in claim 7, wherein said non-organic compounds are selected from the group consisting of cyanides and ammonia compounds.

10. A method as in claim 1, wherein said first stage is performed in an electrolyzer, said electrolyzer including insoluble electrodes.

11. A method as in claim 10, wherein a current density of 10 to 1,000 Ampers per square meter is applied to said insoluble electrodes.

12. A method as in claim 1, wherein said second stage is performed in a reactor.

13. A method as in claim 12, wherein said reactor is an adsorbent catalyzer column.

14. A method as in claim 1, wherein said added catalyst includes at least two oxides of at least one metal selected from the VIIb–VIII groups of the periodic table.

15. A method as in claim 14, wherein said at least one metal is selected from the group consisting of Fe, Mn, Co, Ru, Ni, Pt and Os.

16. A method as in claim 14, wherein one of said at least two oxides is of a higher oxidation state, whereas the other is of a lower oxidation state.

17. A method as in claim 16, wherein said oxide of said higher oxidation state is selected in the range of 55%–85% by mass, whereas said oxide of said lower oxidation state is selected in the range of 45%–15% by mass, respectively.

18. A method as in claim 17, wherein said oxide of said higher oxidation state is selected in the range of 65%–75% by mass, whereas said oxide of said lower oxidation state is selected in the range of 35%–25% by mass, respectively.

19. A method as in claim 16, wherein said oxide of higher oxidation state is selected from the group consisting of $MnO_2$, $CO_2O_3$ and $Fe_2O_3$.

20. A method as in claim 16, wherein said oxide of lower oxidation state is selected from the group consisting of MnO, CoO and FeO.

21. A method as in claim 1, wherein said added catalyst is in a form of grains.

22. A method as in claim 21, wherein said grains have a diameter ranging between 100 μm and 6 mm.

23. A method as in claim 21, wherein said grains include an inner catalyst carrier coated with an active layer of said catalyst.

24. A method as in claim 23, wherein said inner catalyst carrier includes a material selected from the group consisting of activated carbon and aluminum γ-oxide.

* * * * *